Mar. 27, 1923.  
J. R. MEYERS.  
MACHINE FOR MAKING AND FINISHING CHEESE.  
FILED OCT. 30, 1917.
1,450,105.
3 SHEETS—SHEET 3.
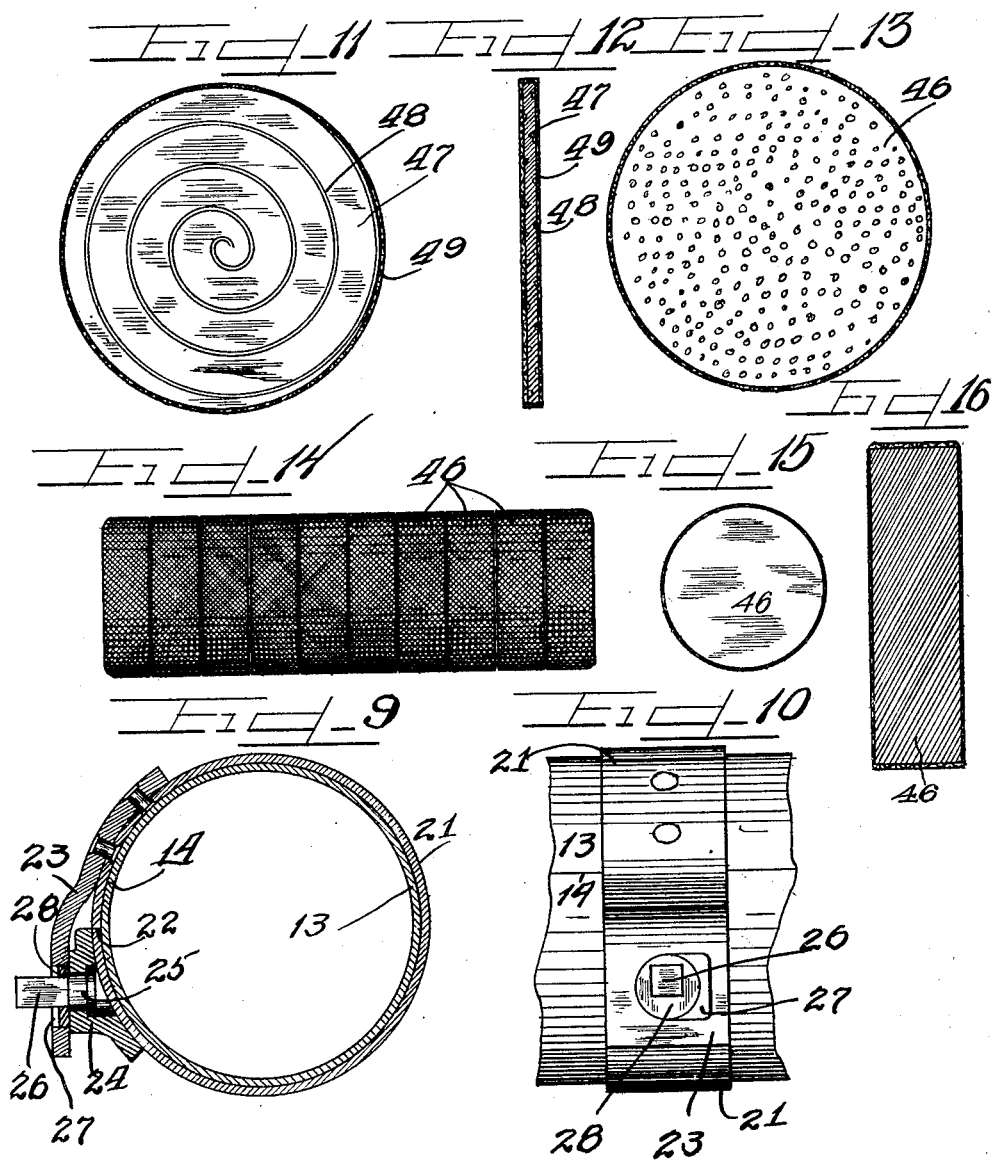

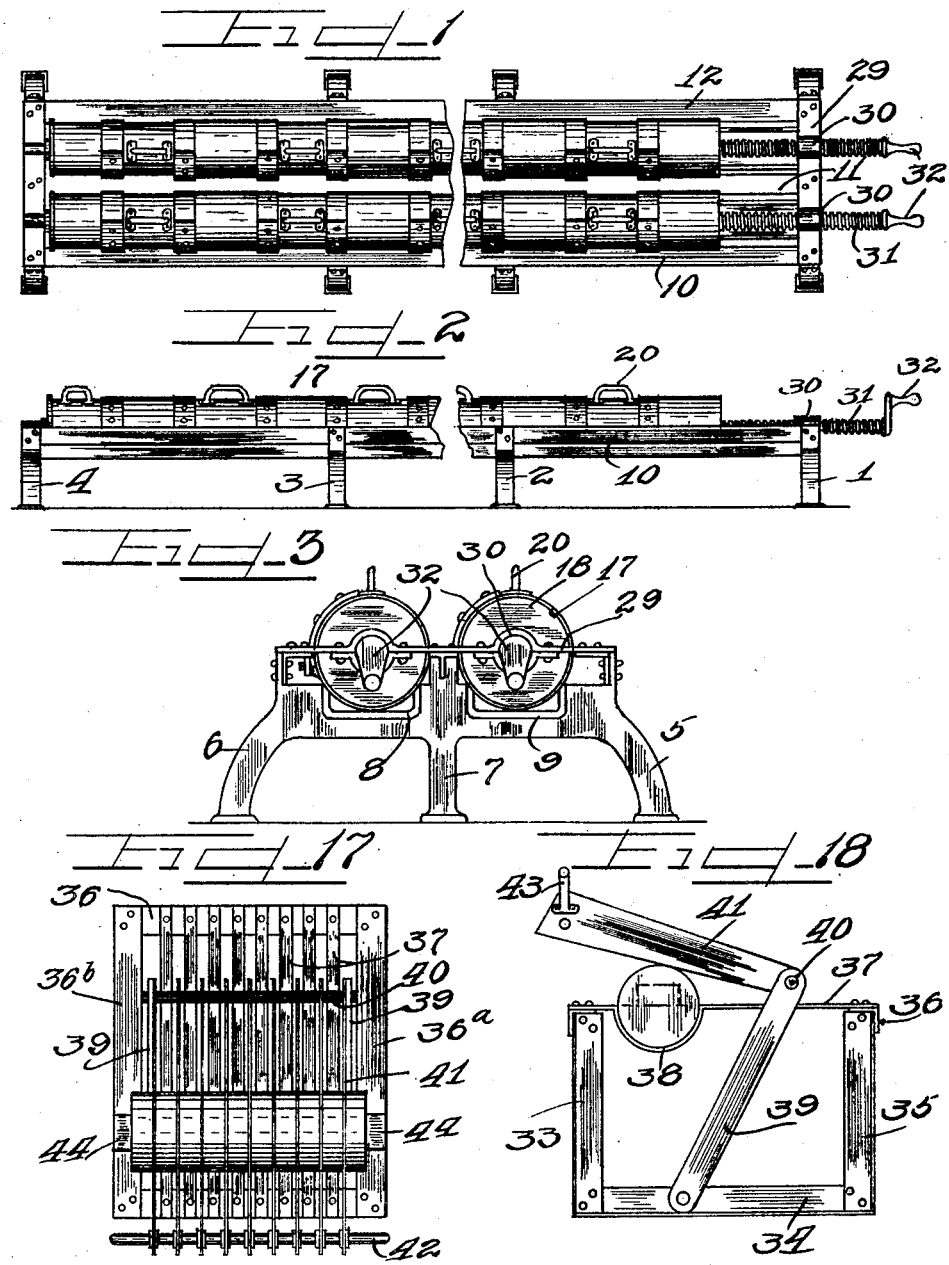

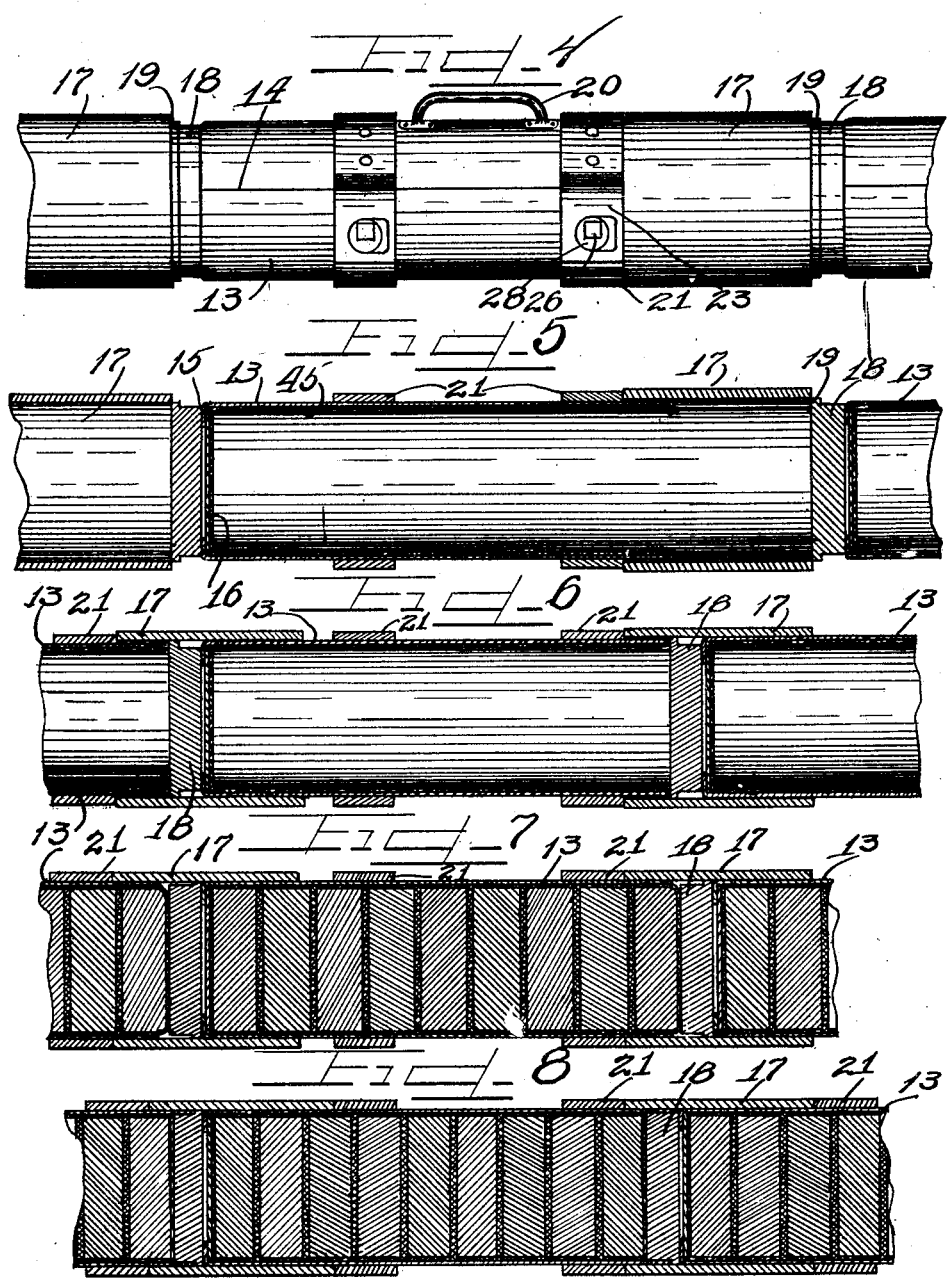

Patented Mar. 27, 1923.

1,450,105

UNITED STATES PATENT OFFICE.

JULIUS R. MEYERS, OF GLENCOE, ILLINOIS.

MACHINE FOR MAKING AND FINISHING CHEESE.

Application filed October 30, 1917. Serial No. 199,247.

*To all whom it may concern:*

Be it known that I, JULIUS R. MEYERS, a citizen of the United States, and a resident of the village of Glencoe, in the county of Cook and State of Illinois, have invented certain new and useful Improvements in a Machine for Making and Finishing Cheese; and I do hereby declare that the following is a full, clear, and exact description of the same, reference being had to the accompanying drawings, and to the numerals of reference marked thereon, which form a part of this specification.

Heretofore, cheese as purchased from the store is usually cut from a large cheese in the shape of a wedge or from a large brick. This leaves two large surfaces exposed to the action of the air which, if left to stand, as is usually necessary before the cheese is all used, the surfaces become hard and greasy which destroys the value of the cheese for eating, leaving it fit only for cooking purposes.

It is an object of my invention to provide a machine in which small pieces or bricks of cheese, in weights of one pound, one-half pound, two pounds or any desired weight according to the demands of the trade, are made and finished which are sold to the consumers in lieu of the cut cheese thereby obviating the spoiling of the cheese adapting it being kept in good condition for a long time and in which only a minimum cut surface is exposed to the deteriorating effects of the atmosphere.

It is furthermore an object of this invention to provide a cheese making and finishing machine in which the cheese is made or molded from the curd and which is also adapted to remove the mechanical holes from the surface of the cheese.

It is also an object of my invention to provide an expansible and contractible mold in which the cheese may be made and finished and which, upon being expanded, permits ready removal of the cheese.

An objection to machines heretofore constructed which has added much to the cost of the cheese for the consumer, is that it has been necessary to use an unduly large amount of cloth in making the finished surface on the cheese. This was necessary because the individual loose cloths were used between adjacent cheeses. These cloths from their character and use were usable but once.

It is an object of this invention to provide cloth covered means between the cheeses that may be washed and used over and over again, thereby reducing the expense for cloth to a minimum.

It is further an object of this invention to provide a novel mold and expanding and contracting mechanism which is simple in construction and thoroughly efficient in operation.

It is further an object of this invention to provide a novel mechanism for cutting the cheese into a plurality of individual cheeses of the desired size.

Other and further important objects of this invention will be apparent from the disclosures in the specification and drawings.

The invention (in a preferred form) is illustrated in the drawings and hereinafter more fully described.

On the drawings:

Figure 1 is a fragmentary top plan view of a battery of cheese molds embodying my invention.

Figure 2 is a fragmentary side elevation thereof.

Figure 3 is an end view of the same.

Figure 4 is an enlarged fragmentary view of a cheese mold.

Figure 5 is a sectional view illustrating a mold in which the curd is placed preparatory to making or pressing the same.

Figure 6 is a similar sectional view, showing the curd fully pressed and the cheese made.

Figure 7 is a similar sectional view, illustrating the individual cheeses after they are cut, again inserted in the mold preparatory to finishing the cut surfaces.

Figure 8 is a similar sectional view, illustrating the final molding and finishing of the individual cheese.

Figure 9 is a transverse section of one of the molds taken through the expanding and contracting mechanism.

Figure 10 is an enlarged fragmentary detail of one of the mold tubes, showing the expanding mechanism in elevation.

Figure 11, is a face view of one of the finishing plates or members with the fabric removed.

Figure 12 is a vertical section of the finishing plate.

Figure 13, is a face view of one of the individual cheeses showing the mechanical holes after cutting.

Figure 14 illustrates the cylindrical cheese cut into ten individual bricks of cheese.

Figure 15 is a face view of one of the finished individual cheeses.

Figure 16 is an enlarged vertical section thereof.

Figure 17 is a top plan view of the cutting machine.

Figure 18 is an end elevation of the cutting machine.

As shown on the drawings:

The cheese forming and finishing mold comprises a battery of mold tubes, the number depending upon the capacity of the plant. In the present instance, the molds are shown in pairs supported upon a suitable bench, table or base comprising end and intermediate members 1, 2, 3 and 4, each of which is provided with outer legs 5 and 6, and a center leg 7, joined by bars 8 and 9, in which are provided suitable notches or seats for the tubes. Suitable bars 10, 11 and 12, connect the members 1, 2, 3 and 4, and form a supporting table.

Each mold is tubular and made up of a plurality of complemental telescoping sections, each of which comprises a cylindrical tube 13, which is split longitudinally, as shown by reference numeral 14, and is open at one end and provided with a flange 15, at the opposite end to which a head 16, is rigidly secured by brazing, rivets or any other suitable manner.

Fitted over the open end of each tube is a sleeve 17, in the open end of which is a presser head 18, each of which is of a diameter to fit in the tube 13, and is provided with a flange 19, of such diameter as to fit in the sleeve 17, but of too great diameter to telescope in the tube 13. Each split tube is provided with a handle 20, and two expanding and contracting mechanisms, although of course, any number of these mechanisms may be employed. Each comprises a band or strap of metal 21, which is provided with a split 22, which breaks joints with the slit 14, of the tube 13, and the strap is rigidly secured to the tube so that expansion and contraction of the band expands and contracts the tube.

Riveted or otherwise secured to each band is an arm or member 23, which, at its outer end, is offset from the band, and between the same and band is a spacing collar 24, provided with a chamber therein in which is rotatably secured the head 25, of a square actuating stud 26, which projects outwardly through apertures in the spacer and arm. Secured on the stud 26, in the aperture 27, in the arm, is an eccentric 28.

A bar 29, is rigidly secured to the member 1, provided with suitable screw nuts 30, through which extend screw shafts 31, provided with handles 32, at their outer ends, and at their inner ends bear against one of the press blocks or heads 18.

The cutting machine is adapted to cut a mold of cheese into a plurality of individual bricks or blocks, and as shown, comprises a frame consisting of angle irons 33, 34, 35, 36, 36$^a$ and 36$^b$, to which is secured a grid table made up of bars 37, deformed at 38, to provide a seat for receiving the cheese. Pivoted to each angle iron 34, is a pivot bar 39, to the upper ends of which is secured a shaft 40, on which are pivoted cutter knives 41, one working between each pair of grid bars. The knives are connected to operate together by means of a shaft 42, and a handle 43, is provided for manually actuating the knives. Stops 44, are provided between which the cheese fits and which retain the end bricks in place when severed.

The operation is as follows:

Before the curd is placed in the tube 13, a cheese cloth lining 45, is placed therein with the outer end lapped around the end of the tube and retained in place by the sleeve 17. The curd is then placed in the tube as shown in Figure 5, and the screw shaft actuated. This in turn telescopes the mold as a whole together by telescoping the mold heads 18, and tubes 13, in the sleeves 17, which compresses the cheese to the desired form or size as shown in Figure 6.

After the cheese is allowed to set for the desired length of time, so that it has a permanent set, the screw shaft is released after which each tube 13, is expanded by manipulation of the studs 26, and eccentrics 27, and the tubes tapped to loosen the cheese, from which it is then removed and placed in the cutting machine.

The cheese is cut into the desired number of individual pieces or cheeses 46, and the cut surface of each has an appearance resembling Figure 13, having more or less mechanical holes therein.

The individual cheeses are then again placed in the mold with a finishing plate between each pair and further compressed for the purpose of finishing the surface of the individual cheeses and for the purpose of eliminating the holes in the cut surfaces of the cheese. This finishing plate consists of a flat circular member 47, which is grooved at 48, or otherwise formed with passageways or channels which provide for drainage of the whey from the individual cheeses as they are further compressed and also provides depressions or pockets into which the cloth which covers the plate is forced as the individual cheeses are compressed. This has the effect of stretching or drawing the cloth slightly as the pressure is applied and facilitates the surfacing of the cheese.

It is an important feature of this invention that these plates 47, are provided with a cloth covering 49, which may be made in envelope form, so that after use the complete plate and cloth covering can be removed as a whole and cleaned ready for use again. This cloth covering bears against the surface of the cheese under compression and not only serves in a measure to keep the cheese from being pressed into and clogging the drainage openings in the plate, but also has the effect of eliminating the holes in the surface of the cheese more readily and providing a better surface than if the cheese was pressed directly against the plate.

After the cheeses and plates are returned to the mold, the tube is contracted ready to finish the molding of cheese. In this operation, the blocks 18, are reversed so that they fit into the open end of the tubes 13, and the screw shaft is then actuated until the mold and cheeses are pressed into the form shown in Figure 8. This operation closes and seals the mechanical holes on the cut surface of the cheese, in other words, finishes the surface of the cheese as shown in Figures 15 and 16, so that the cheeses when removed are ready to be coated and stored to cure.

To remove the cheeses, the tube is expanded and tapped to loosen the cheeses after which they are easily removed.

The machine is capable of handling a large quantity of cheese and thoroughly forms and finishes the product. Furthermore, the difficulty of removing the cheeses in my machine is eliminated by providing expansible molds. Also a positive expanding and contracting mechanism is provided.

It is, of course, understood that the tube is rigidly secured to the head 15, at one end and consequently the expanding opening is of V shape.

Many details of construction may be varied and numerous changes may be made without departing from the principles of my invention and I therefore do not purpose limiting my application for patent otherwise than necessitated by the prior art.

I claim as my invention:

1. A machine for making cheese comprising a split tube open at one end and permanently closed at its opposite end, means for expanding and contracting the tube, and reversible means for finishing cheese in said tube.

2. In a device of the class described, an expandable cheese mold adapted to receive the curd therein and to press the same into a cheese aperture, rims engaged around said mold, eccentric members engaged in said apertures for expanding and contracting the mold, said cheese mold adapted to receive the cheese therein after it is cut into a plurality of individual pieces, and cloth invested finishing plates separating the pieces of cheese.

3. In a device of the class described, a cheese mold comprising a longitudinally slit tube, closed at one end and open at the other end, a sleeve connecting adjacent ends of two tubes, a reversible press head between adjacent tubes of a diameter in one position to fit in the tube and when reversed of such diameter as to not fit in the tube and means for expanding said tube.

4. In a device of the class described, a cheese mold comprising telescoping tubes and sleeves, a press head in each sleeve between the adjacent ends of the tubes, finishing plates adapted to fit in the tube and an investing fabric secured to each plate.

5. A cheese machine comprising a plurality of tubes, sleeves connecting the tubes into which the tubes telescope, a press member between each pair of tubes, a fabric lining fitted in each tube to invest the cheese, and means for expanding each tube.

6. A cheese machine comprising a plurality of tubes, sleeves connecting the tubes into which the tubes telescope, a mold member between each pair of tubes, a fabric lining fitted in each tube, means for expanding each tube, finishing plates for each tube and an investing fabric lining for each plate.

7. In a cheese making and finishing machine, a mold for forming the cheese adapted to receive the cheese cut transversely into individual pieces, means engaged around the mold for contracting the same, a cloth invested plate disposed between adjacent pieces of cheese, and means applying pressure to seal and finish the cut surfaces of the cheese.

8. In a cheese making and finishing machine, a telescoping cheese mold, means for expanding part of the mold to facilitate removal of the cheese therefrom and finishing members for said mold.

9. In a cheese making and finishing machine, a telescoping cheese mold, means for expanding part of the mold to facilitate removal of the cheese therefrom, finishing members for said mold, and reversible members in said mold adapted to be reversed during different operations of the machine.

10. A cheese molding and finishing machine comprising a mold, eccentric means for expanding one end only of said mold, a press for exerting pressure on the cheese in the mold, and surfacing members adapted to fit in the mold.

11. The combination with a cheese press, of a compression chamber for the cheese, and a reversible plunger head co-operating with the compression chamber.

12. In a cheese press, the combination with a compression chamber having an expanded inlet, of a reversible plunger head operable in the expanded inlet, the said head being adapted in one of its positions to insert in the compression chamber and in the reversed position to abut against the end of the compression chamber and be held from insertion in the compression chamber.

13. In a cheese press, the combination with a compression chamber, of a spirally grooved separator and drainage plate for the compression chamber, and a cloth covering completely enveloping the said plate.

14. In a cheese press, the combination with a compression chamber, of a separator plate the opposite sides thereof having drainage channels therein, a fabric covering for the plate, and means for securing the covering on the plate.

15. In a cheese press, the combination with a compression chamber, of a separator plate therefor, a fabric covering on each side of the plate, and means connecting the edges of the fabric coverings to hold the fabric covering on the plate.

16. In a cheese press, the combination with a compression chamber, of a separator and drainage plate for the compression chamber, having passageways formed in the opposite surfaces thereof, and a cloth covering enveloping the said plate.

17. In a cheese press, the combination of a cheese compression chamber, means for applying pressure to the cheese in the chamber, and a separator and drainage plate slidable within the said chamber and having a fabric envelope, the said plate being provided with spiral passageways in the opposite sides thereof adapted to provide drainage openings for the liquid pressed from the cheese.

18. In a cheese press, the combination of a cheese compression chamber, means for applying pressure to the cheese in the chamber, and a separator plate slidable in the pressure chamber and enclosed in a fabric envelope, the said separator plates being provided with passage-ways therein leading to the outer edge of the separator plates for draining the liquid pressed from the cheese.

In testimony whereof I have hereunto subscribed my name in the presence of two subscribing witnesses.

JULIUS R. MEYERS.

Witnesses:
CHARLES W. HILLS, Jr.,
EARL M. HARDINE.